(12) United States Patent
Kanazawa et al.

(10) Patent No.: US 7,042,537 B2
(45) Date of Patent: May 9, 2006

(54) IMAGE DISPLAY PANEL

(75) Inventors: Masaru Kanazawa, Tokyo (JP); Isao Kondou, Tokyo (JP); Fumio Okano, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 101 days.

(21) Appl. No.: 10/679,294

(22) Filed: Oct. 7, 2003

(65) Prior Publication Data
US 2004/0080696 A1    Apr. 29, 2004

(30) Foreign Application Priority Data
Oct. 28, 2002    (JP)    ................. 2002-312035

(51) Int. Cl.
G02F 1/1335    (2006.01)
(52) U.S. Cl. ................. 349/106; 349/108; 349/146
(58) Field of Classification Search ................. 349/106, 349/107, 108, 109, 145, 146; 345/88, 613, 345/694, 695
See application file for complete search history.

(56) References Cited

U.S. PATENT DOCUMENTS

| | | | |
|---|---|---|---|
| 6,750,875 B1 * | 6/2004 | Keely et al. | 345/613 |
| 6,850,294 B1 * | 2/2005 | Roh et al. | 349/106 |
| 6,903,754 B1 * | 6/2005 | Brown Elliott | 345/694 |

* cited by examiner

*Primary Examiner*—Toan Ton
*Assistant Examiner*—Tai Duong
(74) *Attorney, Agent, or Firm*—Armstrong, Kratz, Quintos, Hanson & Brooks, LLP

(57) ABSTRACT

An image display panel that is composed of a plurality of picture elements aligned in a form of a matrix wherein picture elements consist of red, green and blue color cells corresponding to three primary colors and a picture element wherein three color cells are placed in an order of a red cell 2R, a green cell 2G and a blue cell 2B from a peripheral to the other peripheral and the other picture elements where three color cells are placed in an order of a blue cell 2B, a green cell 2G and a red cell 2R from a peripheral to the other peripheral are alternatively arranged in the vertical direction to the direction of the arrange of the cells in the picture element has been proposed. The invention can improve the picture quality of image display panel.

1 Claim, 6 Drawing Sheets

☐ A Picture Element 2

IMAGE DISPLAY PANEL

FIELD OF THE INVENTION

This invention relates to an image display panel that has picture elements aligned in a matrix form wherein each picture element comprises three cells corresponding to three primary colors.

BACKGROUND OF THE INVENTION

The LCD (Liquid Crystal Display) has been a well-known display device for image display panel applications. For example, a color LCD panel using color LCD composes of a plurality of picture elements aligned in a matrix form wherein the light emitted from each cell corresponding to each primary color are mixed for each picture element and composes an image of the pictures.

An example of the configurations of conventional image display panels is explained with referring to the FIG. 9A, which shows the conceptual configuration of a conventional image display panel.

As shown in FIG. 9A, each one of picture elements 7 that compose the image display panel is constructed with one of three cells: a red cell 7R that transmits only red-color light, a green cell 7G that transmits only green-color light and blue cell 7B that transmits only blue-color light. They are aligned in the picture element 7 in an order of 7R, 7G and 7B from one peripheral side (as shown "A" in FIG. 9A) to another one ("A'" in FIG. 9A).

This configuration of image display panels presents a picture image in such a way that the light emitted from a backlight installed in the back side of the panel transmits each cell as 7R, 7G and 7B and the light transmitted through each cell corresponding to each primary color is mixed with other lights at each picture element and the mixed color of the lights composes the image of the pictures.

In this configuration of the image display panel, each picture element is composed with a red cell 7R, a green cell 7g and a blue cell 7B arranged in such an order, therefore the colored light balanced at the location namely a position (the center position) that viewers perceive the light emitting therefrom for each picture element 7 is close to the green cell 7G which is placed in the center of the picture element 7.

However, the center of each colored light emitted from each cell 7R, 7G or 7B is localized at about the center of each such cell. Therefore, the pseudo center of each color light is designated to the center of the whole picture element 7 that is determined after the image processing and the pseudo center is apart from the actual centers of lights as red-color, green-color and blue color lights. Therefore, the actual center of such red, green and blue colored lights deviates from the pseudo center of the picture element that would cause the blurring of the color due to the less color-mixing of such three primary colors in the picture element when the picture element composes the contours, fine lines etc. for presenting an image of a picture.

For the picture element constructed shown in FIG. 9A, such that the red cell 7R, the green cell 7G and blue cell 7B are aligned from a peripheral (as shown "A" in FIG. 9A) to the other peripheral (as shown "A'" in FIG. 9A), when a white vertical line (to the direction of the extensions of "A" peripheral and "A'" peripheral) against the black back ground is displayed a peripheral of the white line is blurred to be blue and the other to be red.

For this case, the degree of visual perceptivity in the color recognition can be regarded as depending on the difference of the color signal for each of red, green and blue colors emitted from the picture elements of the image display panel. For example, when the signal level of the red color is larger than the signal levels of the other colors, then the red color in the displayed image is emphasized for the human visual perceptivity and when the signal level of the red color is smaller than the signal levels of the other colors, then the red color in the displayed image is weakened for the human visual perceptivity. Since digital signals are usually input to image display panels, the change of the signal level steeply changes for the adjacent cells, therefore it tends that the blurring is easily made in the digital signal display applications.

For example, the color blurring is considered using a square shaped picture element that is widely used for image display panels. Letting the picture element 7 have a peripheral length L1=1 and the red cell, the green cell and blue cell be constructed with color filters that have the same colors and that are evenly arranged from a side (as "A" peripheral as shown in FGI. 9A) to the other side (as "A'" peripheral as shown in FGI. 9A), the degree of "red" emphasis ΔR (as seen red rich color) which is a deviation from the neutral level has a variation against the position from the "A" to "A'" as shown in FIG. 9B. For a homogenous color arrangement such that the color occupation against a linear position in the picture element is uniform for each color, the red color emphasis ΔR changes steeply at the boundary of between the red cell and the green cell and therefore this configuration of the picture element tends to show blurring.

Therefore one of the possibilities to remove or solve this problem is to use a smoothing filter to correct the contour so that the blurring is suppressed. However the conventional smoothing filters merely have the same filtering characteristics homogenously to three primary colors and do not shift the locations of the centers of color lights for the three primary colors. As the result, the color blurring is not sufficiently eliminated by using the smoothing filters. There is an alternative solution such that smaller sized cells are used, however such smaller cells are bound in limitations as the manufacturing difficulty and the increasing of manufacturing cost therefore the color blurring is not sufficiently solved out.

SUMMARY OF INVENTION

This invention is made for such a technical and practical limitations and the bottleneck of technology and has an objective to provide an improved image display panel in the picture quality especially in less blurring.

In order to solve the technical problems as described above, the image display panel according to the present invention has picture elements aligned in a matrix form wherein each picture element comprises three cells corresponding to three primary colors as red, green and blue colors in an order of arrangement in a direction (which is along a horizontal line in the explanation of this invention) and the vertical arrangement of these picture elements (which is along a vertical line in the explanation of this invention) is that two adjacent picture elements have a cell alignment such that the two cells locating at the both peripherals of the picture element are mutually exchanged in the vertical alignment, therefore these two cells are alternatively placed in the vertical line)

The image display panel according the present invention has picture elements arranged in a form of a matrix wherein each picture element comprises a red-color cell, a green-color cell and a blue-color cell that correspond to three primary colors. The red, green and blue lights respectively emitted from the red, green and blue cells are mixed at each picture element and turn to present the mixed color light on the picture element wherein the plurality of such mixed color lights are displayed and the plurality of these mixed colors on the picture elements is connected and combined to form an image of a picture.

Each picture element of the image display panel according to the present invention has an alignment of the red cell, green cell and blue cells in a alignment line and on the other alignment line normal to the such a cell alignment two adjacent picture elements have two color cells at both side so that these two color cells are placed in a manner of alternatively exchanging.

In this configuration of cell alignment in the picture elements, the two cells locating at the both side of the picture element are alternatively aligned, therefore the human eyes which can only perceive the image patterns in low spatial frequency for color changing sense such an alternation as microscopic color changing patterns in a view of an averaged scale rather than in a high resolution scale. Therefore, this configuration has less observable blur in overall of the display presentation and serves for improving the picture quality of display image.

In order to solve the above problem, this invention provides another configuration of an image display panel such that the panel has a plurality of picture elements arranged in a form of a matrix in a plane, that each picture element comprises a red cell, a green cell and blue cell which correspond to the three primary colors aligned in the picture element area and that the cell has mutually different planar shape from each other but has the same area in a unit of each picture element.

The image display panel of this another configuration according to the present invention has picture elements arranged in a form of a matrix in a plane wherein each picture element comprises a red-color cell, a green-color cell and a blue color-cell that correspond to three primary colors. The red, green and blue lights respectively emitted from the red, green and blue cells are mixed at each picture element and present the mixed color light on the picture element wherein the plurality of such mixed color lights are displayed and the plurality of these mixed colors on the picture elements is connected and combined to form an image of a picture.

Each picture element of the image display panel of another configuration according to the present invention has an alignment of the red cell, green cell and blue cells such that the each cell has mutually different planar shape but has the same area in a unit of each picture element.

In this configuration of cell alignment in the picture elements, the red cell, the green cell and the blue cell which compose a picture element are designed to have mutually different planar shapes but to have same area occupied in the picture element. Therefore, it is possible to relax the change of the signal level among three color cells as well as the signal level of each color cell is kept uniformly same and the blur of colors can be reduced. The image display panel that has this configuration of cell alignment resultantly serves for the improvement of picture quality of display image.

Accordingly, the present invention serves to provide a preferred embodiment such that the panel has a plurality of picture elements arranged in a form of a matrix in a plane, that each picture element consists of a red cell, a green cell and blue cell which correspond to the three primary colors aligned in the picture element area and that the each picture element is designed such that the green cell is placed in a shape of a linear belt which has a declined angle (for example, 45 degrees against one of the peripheral of the picture element) and the red cell and the blue cell are placed along the green cell and the areas of three cells are same within the picture element.

In this image display panel, two picture elements are alternatively placed so that the blue cell and the red cell in a picture element face the red cell and the blue cell of another picture element, respectively. By this alignment, the red cell and the blue cell are alternatively placed in the direction vertical to a horizontal alignment of these two picture elements. The red cells and the blue cells are alternatively placed in small microscopic areas, therefore the human eyes which can only perceive the image patterns in low spatial frequency in colors sense such an alternation as microscopic color changing patterns in a view of an averaged scale rather than in a high resolution scale. Therefore, this configuration has less observable blur in overall of the display presentation and serves for improving the picture quality of display image.

DETAILED DESCRIPTION OF THE INVENTION

A plurality of embodiments according to this invention will be explained in details in referring to drawings.

FIRST EMBODIMENT

Figure 1:
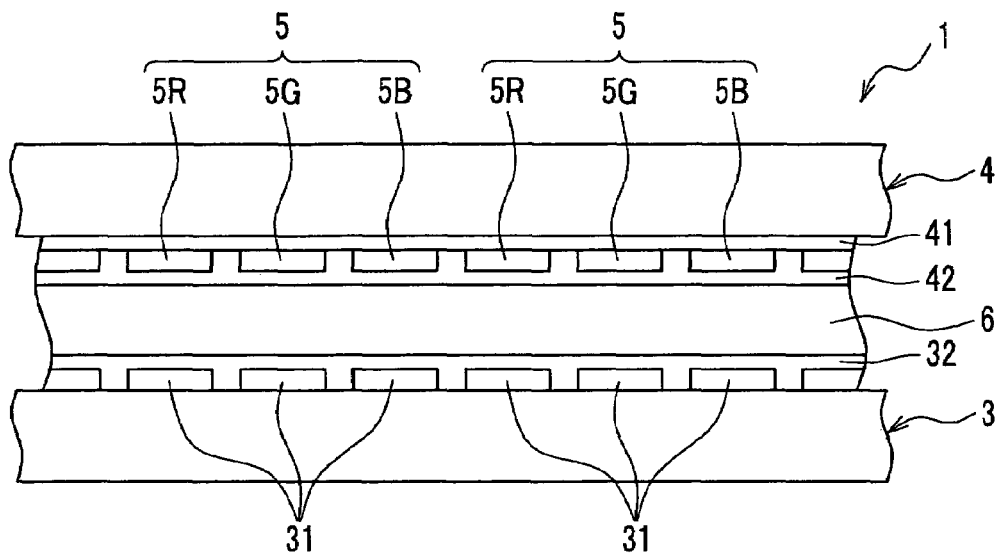
FIG. 1 is a drawing that explains the conceptual construction of an image display panel of the first embodiment according to the present invention.

FIG. 1 shows a drawing to explain the conceptual configuration according to an embodiment of the present invention The image display panel 1 is, for example, a color liquid crystal display using LCD device element, wherein a plurality of picture elements, each of which consists of a pair of a red cell, a green cell and a blue cell that correspond to three primary colors, are placed in a form of a matrix in a plane.

The image display panel 1 has a pair of glass substrates 3 and 4 facing each other with a small gap. In the peripheral area of the both glass substrates, spacers which are not shown in the present drawings are set. Liquid crystal material such as nematic liquid crystal of cyano family is led into an inner room surrounded by these glass substrates and spacers and the liquid crystal material is sealed off in the room to form a plurality of liquid crystal cells which work finally as color cells with color filters of red, green and blue colors.

One of the glass substrates as shown by "3" has TFTs (Thin Film Transistors) working as switching devices, transparent electrodes 31 made of ITO (Indium Tin Oxide), etc.

that work to drive the liquid crystal cells and alignment film 32 that covers the major surface of the glass substrate 3. This construction composes a TFT array on the glass substrate 3.

The other glass substrate 4 has a transparent electrode 41 on the major surface, color filters 5 on the transparent electrode 41 and an alignment film 42 that covers the glass substrate 4 and faces against the other alignment film 32 formed on the substrate 3.

Figure 2:
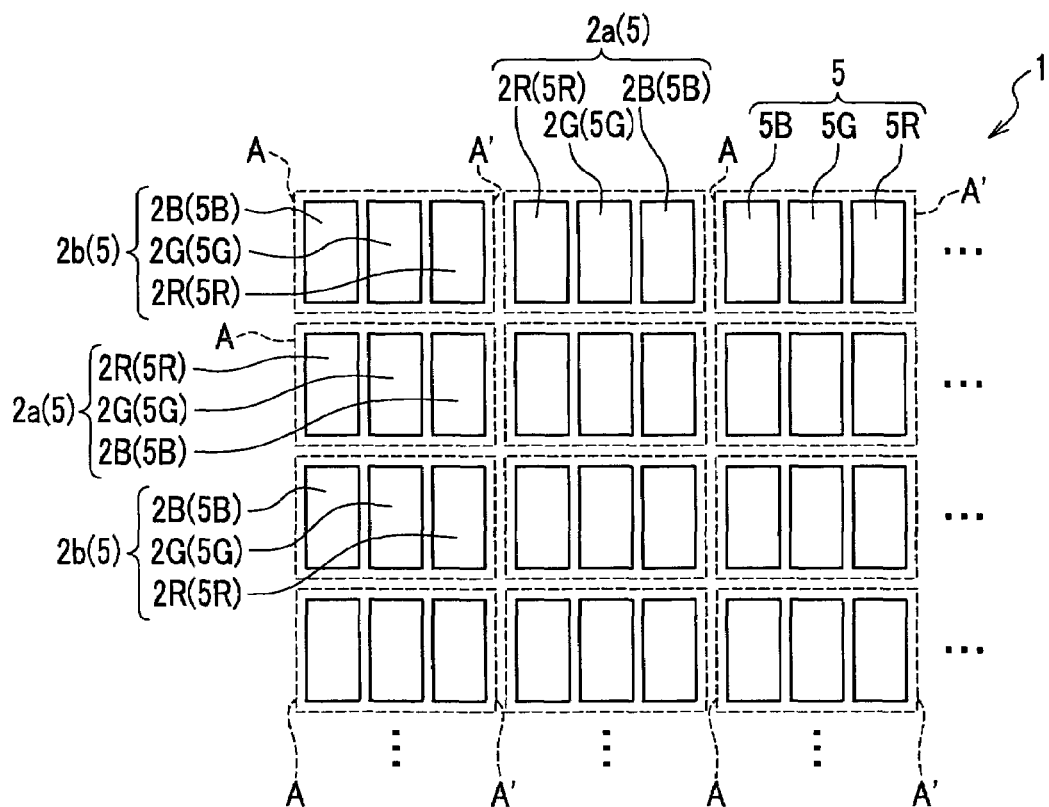
FIG. 2 is a drawing that shows the conceptual configuration of cells that compose picture elements.

The color filters 5 formed in the glass substrate 4 have, as shown in FIG. 1 and FIG. 2, three kinds of filters as a red filter 5R that transmits only red-color light, a green filter 5G that transmits only green-color light and a blue filter 5B that transmits only blue-color light. These filters 5R, 5G and 5B are formed on the transparent electrode 41 which covers the substrate 4 and construct red cells 2R, green cell 2G and blue cells 2B with the transparent electrodes 31 and 41, respectively.

For the image display panel 1, as shown in FIG. 2, picture elements 2a where three color cells are placed in an order of a red cell 2R, a green cell 2G and a blue cell 2B from a peripheral (the peripheral A shown in FIG. 2) to the other peripheral (the peripheral A' shown in FIG. 2) and picture elements 2b where three color cells are placed in an order of a blue cell 2B, a green cell 2G and a red cell 2R from a peripheral (the peripheral A shown in FIG. 2) to the other peripheral (the peripheral A' shown in FIG. 2) are placed in the vertical direction and the horizontal direction.

This image display panel 1 works such that the light emitted from the back light source (which is not shown in the drawings) put in the back of this image display panel transmits each of a red cell, a green cell and a blue cell that compose picture elements 2, the color lights transmitting these color cells mixed in each picture elements 2 present a color in each picture element and such colors presented in the picture elements 2 are finally combined and connected to compose images of pictures.

For this construction of the image display panel 1, as shown in FIG. 2, picture elements 2a where three color cells are placed in an order of a red cell 2R, a green cell 2G and a blue cell 2B from a peripheral (the peripheral A shown in FIG. 2) to the other peripheral (the peripheral A' shown in FIG. 2) and picture elements 2b where three color cells are placed in an order of a blue cell 2B, a green cell 2G and a red cell 2R from a peripheral (the peripheral A shown in FIG. 2) to the other peripheral (the peripheral A' shown in FIG. 2) are alternatively arranged in the vertical direction.

Figure 3A:
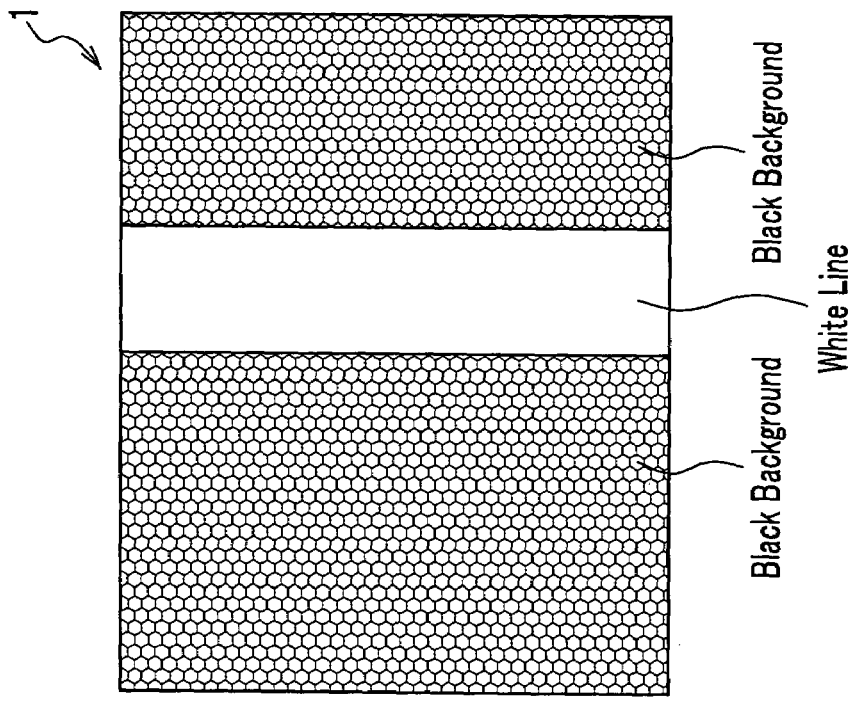
FIG. 3A and FIG. 3B are the drawings that explain the state of the generation of color blur and apparent view for human visual sense, respectively.
Figure 3B:
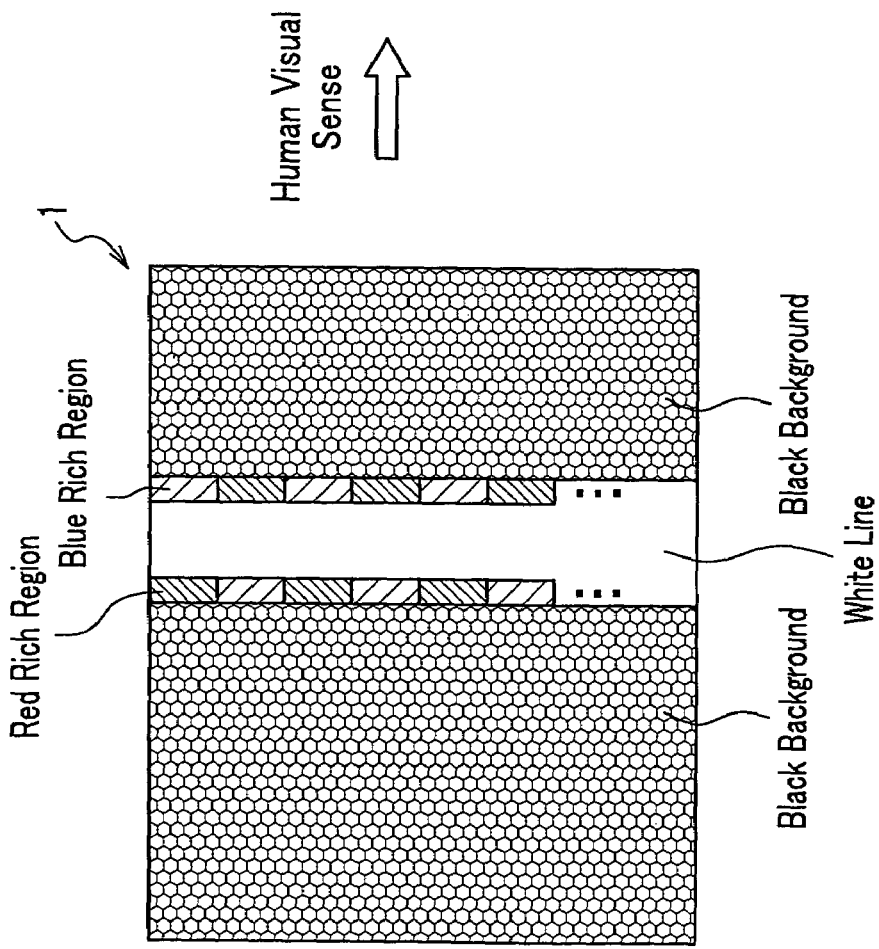

For this cell configuration, a white line is presented in a vertical direction with a black background color on the image display panel 1 as shown in FIG. 3A and FIG. 3B, for example, a red rich region and blue rich region appear in a shape of very fine regions alternatively aligned. Since the human eyes which can only perceive the image patterns in low spatial frequency in color changing sense such an alternation as microscopic color changing patterns in a view of an averaged scale as shown in FIG. 3B and the blur observed by viewers is much lessened in overall of the display presentation.

For this construction of the image display panel 1, it is possible to improve the picture quality of display image by such a configuration that two kinds of picture elements in the vertical direction, such as picture elements 2a where three color cells are placed in an order of a red cell 2R, a green cell 2G and a blue cell 2B from a peripheral (the peripheral A shown in FIG. 2) to the other peripheral (the peripheral A' shown in FIG. 2) and picture elements 2b where three color cells are placed in an order of a blue cell 2B, a green cell 2G and a red cell 2R from a peripheral (the peripheral A shown in FIG. 2) to the other peripheral (the peripheral A' shown in FIG. 2), are alternatively placed in the vertical direction.

SECOND EMBODIMENT

Figure 4:
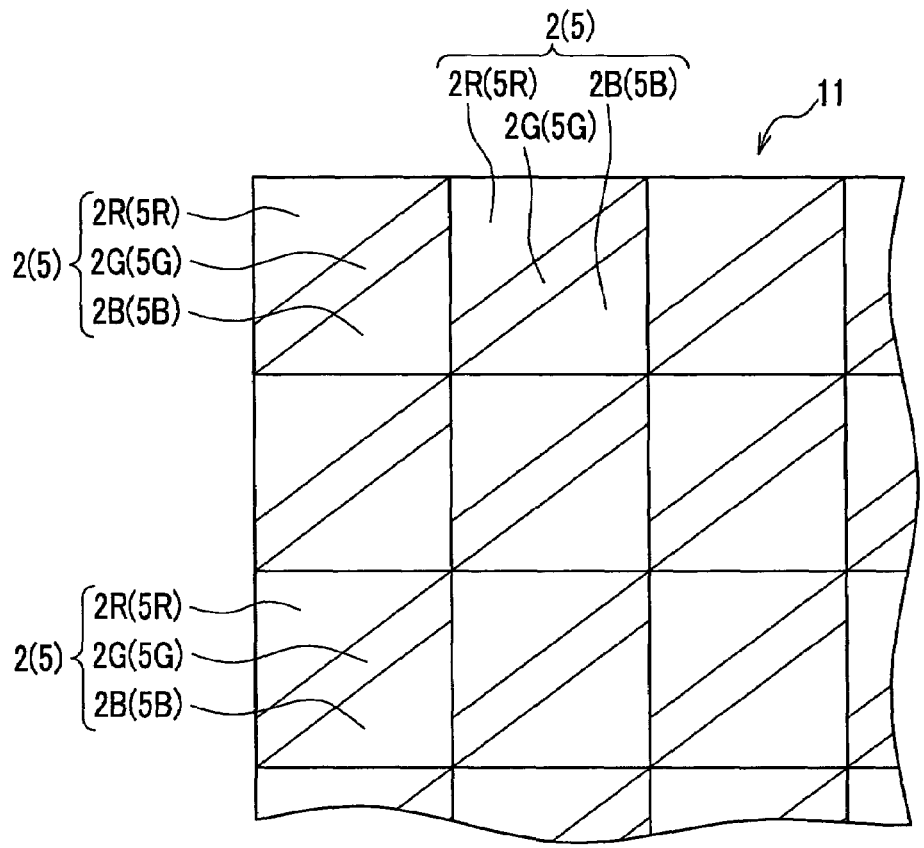
FIG. 4 is a drawing that explains the conceptual configuration of picture elements according to the second embodiment of the present invention.
Figure 5:
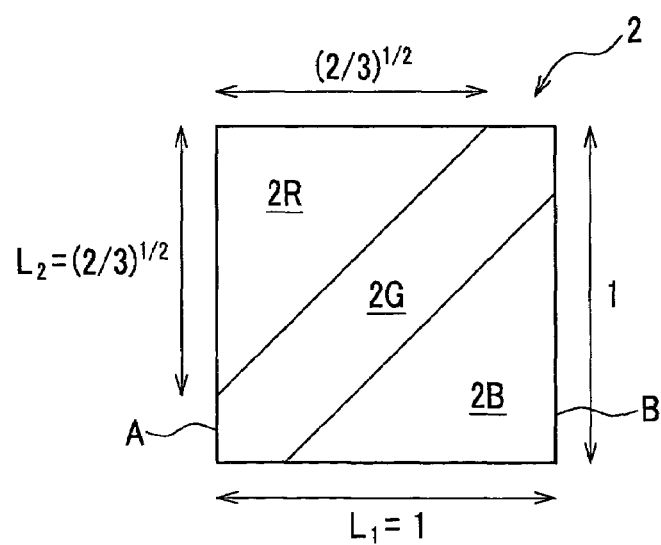
FIG. 5 is a drawing that explains a conceptual construction of the picture element.

The image display panel according to the second embodiment of the present invention will be explained in the next. FIG. 4 shows a drawing to explain the conceptual configuration according to the second embodiment of the present invention Each picture element 2 of the image display panel 11, as shown in FIG. 5, has a square shape of which peripheral has a length $L1=1$ wherein two isosceles triangles of which right-angle vertexs coincide with the a pair of facing corners of the square and of which two isosceles have a length $L2=(\frac{2}{3})^{1/2}$ and a red cell 2R and a blue cell 2B are assigned to one of these two isosceles triangles and a green cell 2G is assigned to the remaining central polygon of a belt shape locating in the square with a certain predetermined angle (which is 45 degrees against a peripheral of the square) between these two isosceles triangles. Then these cells have different shapes against viewers but have the same areas within the picture element 2 as a whole.

Figure 6A:
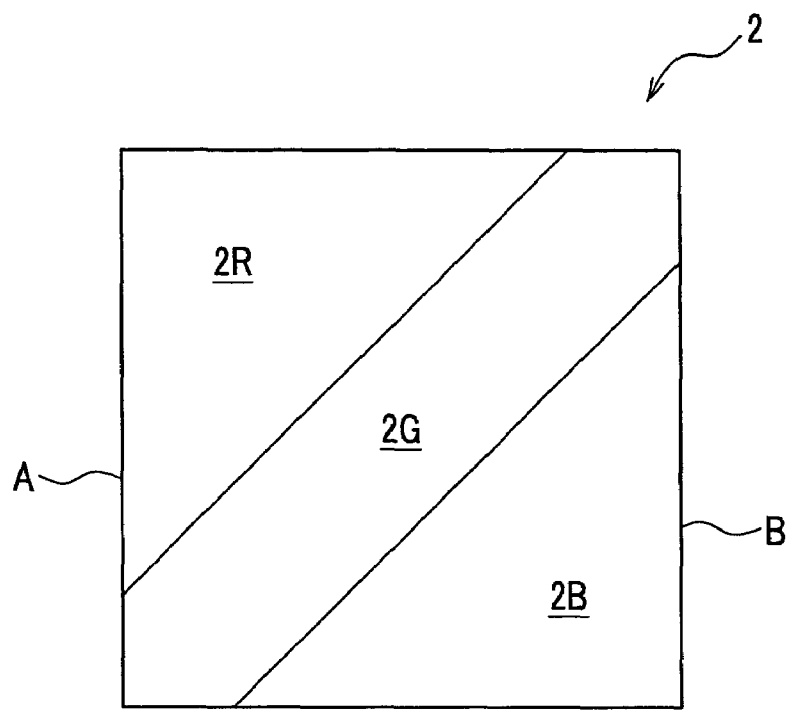
FIG. 6A and FIG. 6B are drawings that explain the degree of "red" emphasis for the picture element configured as shown in FIG. 5.
Figure 6B:
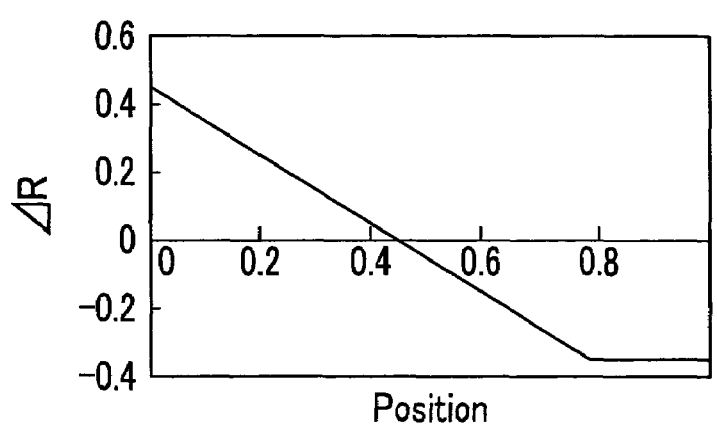

For this configuration, the degree of "red" emphasis $\Delta R$ (as seen red rich color) at the picture elements that compose the image display panel 11 can be defined by the equation (1) and the variation of "red" emphasis $\Delta R$ against the position from a peripheral ("A" peripheral side in FIG. 6A) to the opposite peripheral ("B" peripheral side in FIG. 6A) is given as in FIG. 6B.

$$\Delta R = \frac{2}{3}R - (B+G)/3 \qquad (1)$$

Where, R, G and B are the intensities of the colored lights emitted from the red, green and blue cells, respectively.

Figure 9A:
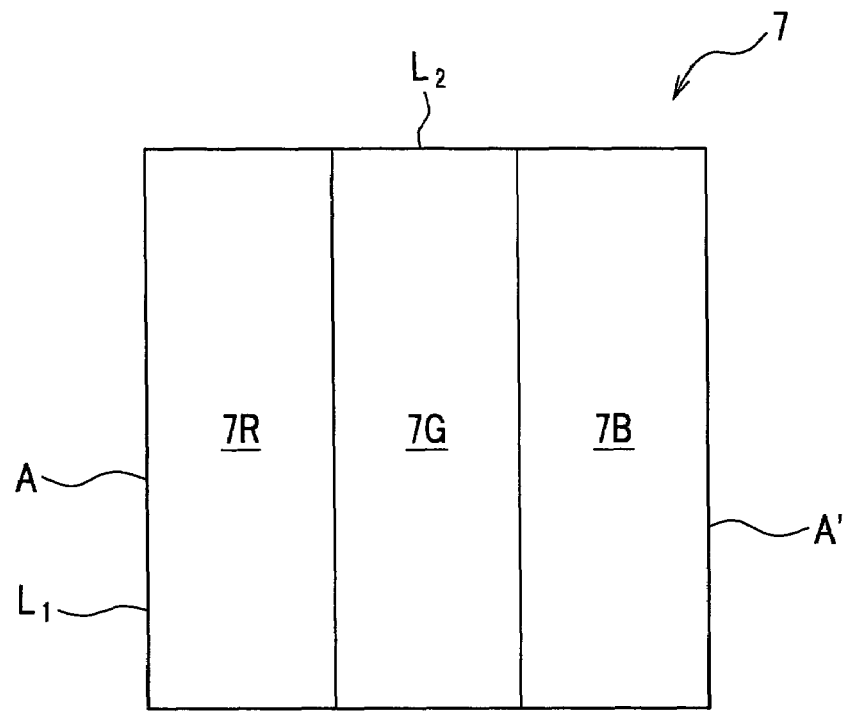
FIG. 9A and FIG. 9B are drawings that explain a conceptual configuration of the picture element and the degree of "red" emphasis for the picture element configured as shown in FIG. 9A, respectively.
Figure 9B:
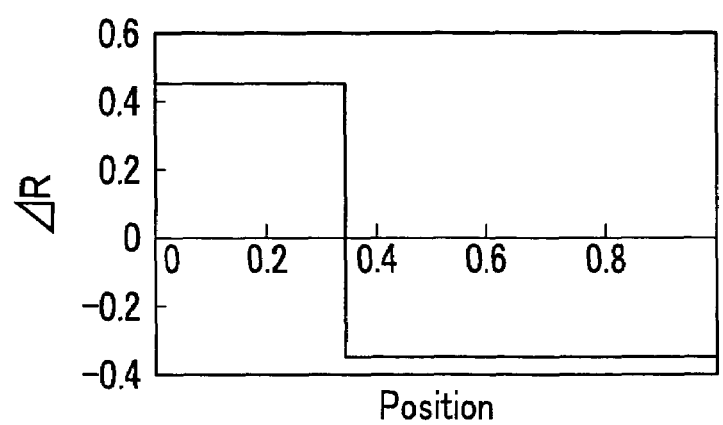

As shown in FIG. 6, it can be confirmed that the variation of the degree of "red" emphasis $\Delta R$ against the position from a peripheral ("A" peripheral side in FIG. 6A) of the picture element to the opposite peripheral ("B" peripheral side in FIG. 6A) is smaller than the variation of the degree of "red" emphasis $\Delta R$ against the position from a peripheral (as shown "A" in FIG. 9A) to the opposite peripheral (as shown "A'" in FIG. 9A) which is the case for a homogenous color arrangement such that the color occupation against a linear position in the picture element is uniform for each color. This phenomenon is same as "blue" emphasis $\Delta B$ (as seen as blue rich color), therefore it can be possible that the variation of the degree of "blue" emphasis $\Delta B$ for the picture element configuration as shown in FIG. 5 is smaller than the variation of the degree of "blue" emphasis $\Delta B$ for the picture element configured as shown in FIG. 9A.

In this construction of the picture element 2 of the image display panel 11 such that a red cell and a blue cell assigned to the two isosceles triangles are put along a green cell 2G assigned to the remaining central polygon of a belt shape locating in the square with a certain predetermined angle (which is 45 degrees against a peripheral of the square) between the red cell 2R and the blue cell 2B, the red, green and blue cells have different shapes but the same areas in the picture element 2, it is possible to suppress the variations of degrees of "red" emphasis $\Delta R$ and "blue" emphasis $\Delta B$ against the position from a peripheral, which serves to prevent the "red" emphasis and "blue" emphasis for the human visual sense and suppress the blur. Therefore, this configuration has less observable blur in overall of the display presentation and serves for improving the picture quality of display image.

As it has been explained, the image display panel 1 according to the first embodiment of the present invention can lessen the observable color blur and improve the picture quality of display image by composing the panel with two adjacent picture elements, as one that has alignment of three color cells as an order of a red cell 2R, a green cell 2G and a blue cell 2B and the other that has alignment of three color cells as an order of a blue cell 2B, a green cell 2G and a red cell 2R, alternatively placed in the vertical direction. On the other hand, the image display panel 11 according to the second embodiment of the present invention can prevent the "red" emphasis and "blue" emphasis for the human visual sense by constructing the picture element 2 in a shape that a red cell 2R and a blue cell 2B are put along a green cell 2G which is the central polygon of a belt shape locating in the square with a certain predetermined angle between the red cell and the blue cell, the red, green and blue cells have different shapes but the same areas in the picture element 2, therefore it is possible to lessen the observable color blur and improve the picture quality of display image, as well.

In addition, the image display panels according to the present invention are not confined in the image display panel 1 and the image display panel 2 as explained in the first embodiment or the second one, respectively, but as far as not deviating the substantial principles and purpose, they can be modified to be applied to other panels. Despite of these embodiments as using an LCD device as the display device for the application of the liquid crystal display panel as an example, the present invention can be preferably applied to a planar-matrix display device such as PDP (Plasma Display Panel), LED (Light-Emitting Diode), OLED (Organic Light-Emitting Diode), EL (Electronic Luminescence) etc. For these applications of the present invention, it is possible to prevent the red color emphasis and blue color emphasis for human visual sense by using two adjacent picture elements as shown in the first embodiment, as one that has alignment of three color cells as an order and the other that has alignment of three color cells as a reverse order so that the alternatively placing of these two color cells in the vertical direction make the two color cells in picture elements alternatively appearing and by constructing the picture element in a shape that a red cell and a blue cell are put along a green cell which is the central polygon of a belt shape locating in the square with a certain predetermined angle between the red cell and the blue cell, the red, green and blue cells have different shapes but the same areas are kept in the picture element, then it is possible to lessen the observable color blur, and improve the picture quality of display image, as well.

Figure 7A:
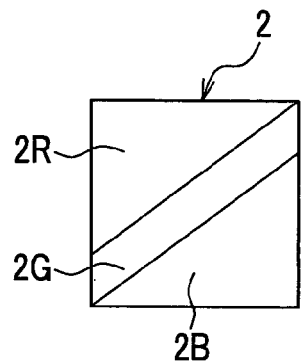
FIG. 7 is a drawing that shows another example of an alignment of cells that compose a picture element.
Figure 7B:
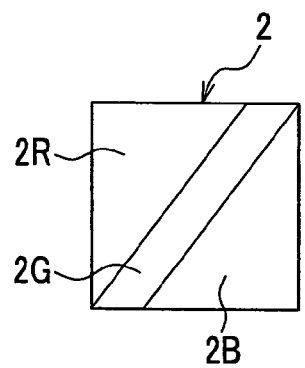
Figure 7C:
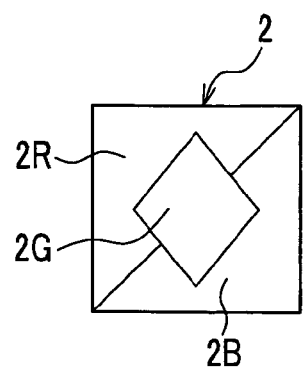
Figure 8:
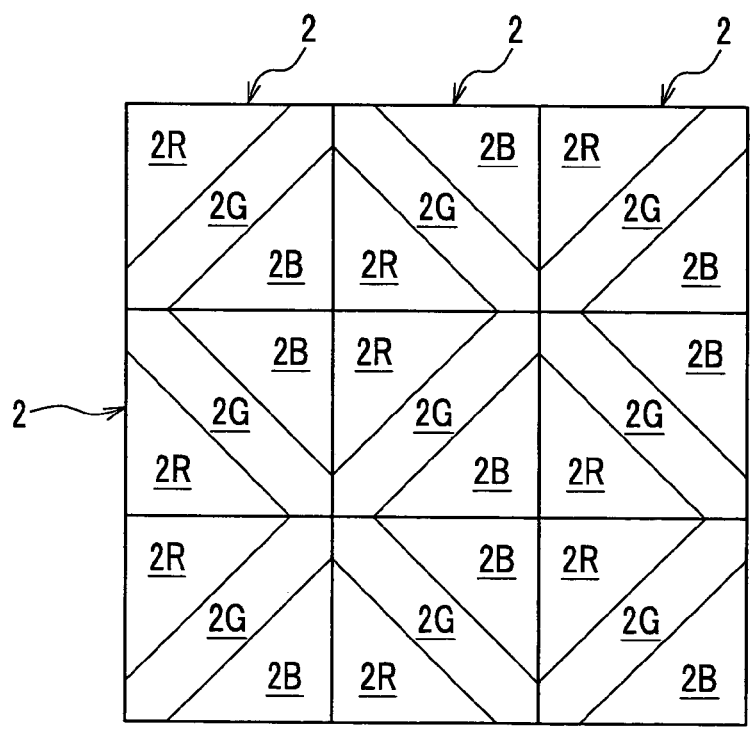
FIG. 8 is a drawing that shows another example of an alignment of cells that compose a picture element.

In the second embodiment, the picture element 2 of the image display panel 11, as shown in FIG. 5, is designed to have a square shape of which peripheral has a length L1=1 wherein two isosceles triangles of which right-angle vertexs coincide with the a pair of facing corners of the square and of which two isosceles have a length L2=($\frac{2}{3}$)$^{1/2}$ and a red cell and a blue cell are assigned to one of these two isosceles triangles and a green cell is assigned to the remaining central polygon of a belt shape locating in the square. However, a red cell 2R and a blue cell 2B are put along a green cell 2G which is the central polygon of a belt shape locating in the square with a certain predetermined angle between the red cell 2R and the blue cell 2B, the red, green and blue cells have different shapes and the planar shapes of these cell can be arbitrarily determined as far as these cells have same areas in the picture element 2 as a whole. Therefore, the present invention provides the configuration of the cell patterns as shown in FIG. 7A, FIG. 7B and FIG. 7C. In addition, the picture element 2 as shown in FIG. 5 is configured with the composing cells as 2R, 2G and 2B in an horizontal alignment, the other picture element 2 is configured with the composing cells as 2B, 2G and 2R and these picture elements arranged in the right angle to the horizontal alignment are alternatively placed so that the adjacent picture elements have the blue cell 2B and the red cell 2R alternatively exchanged in the positions as shown in FIG. 8. Since these configurations of the color cells can prevent the red color emphasis and blue color emphasis for human visual sense, it is possible to lessen the observable color blur and improve the picture quality of display image, as well.

As explained above, the image display panel according to the invention described in claim 1 can make the color changing on the image display panel seen in a view of an averaged scale rather than in a high resolution scale. Therefore, it is possible to lessen the observable color blur and improve the picture quality of display image.

The image display panel according to the invention described in claim 2 provides the cells in each picture element in different shapes so that the change of the color signal level among these cells can be relaxed and moderated. Therefore, it is possible to lessen the observable color blur and improve the picture quality of display image, as well.

The image display panel according to the invention described in claim 3 provides the cells in a configuration that a red cell and a blue cell are put along a green cell which is the central polygon of a belt shape locating in the square with a certain predetermined angle between the red cell and the blue cell, therefore the change of the color signal level among these cells that compose a picture element can be relaxed and moderated. As the results, it is possible to lessen the observable color blur and improve the picture quality of display image, as well.

The image display panel according to the invention described in claim 4 can make the change of the color signal level among these cells that compose a picture element relaxed and moderated and can make microscopic color changing patterns in a view of an averaged scale. As the results, it is possible to lessen the observable color blur and improve the picture quality of display image, as well.

What is claimed is:

1. An image display panel comprising a plurality of picture elements aligned in a form of a matrix, with;
   each one of said picture elements comprising a red cell, a green cell and a blue cell corresponding to three primary colors as red, green and blue colors in an order of cell alignment in each one of said picture elements,
   two of said picture elements adjacently aligned in a direction vertical to said direction of a cell alignment are arranged such that two said cells locating at both peripherals of each one of said two picture elements mutually alternate in said direction, and
   two of said picture elements adjacently aligned in a direction horizontal to said direction of a cell alignment are arranged such that two said cells locating at both peripherals of each one of said two picture elements mutually alternate in said direction.

* * * * *